INVENTORS
EDWARD JOHN JEYE
ROBERT H. BOSWORTH
BEN C. NICHOLS
RAYMOND F. KACZYNSKI

BY Herbert L. Davis
ATTORNEY

INVENTORS
EDWARD JOHN JEYE
ROBERT H. BOSWORTH
BEN C. NICHOLS
RAYMOND F. KACZYNSKI
BY Herbert L. Harris
ATTORNEY April 27, 1965  E. J. JEYE ETAL  3,180,592
HOT GAS CONTROL DEVICE
Filed April 9, 1962  5 Sheets-Sheet 5

INVENTORS
EDWARD JOHN JEYE
ROBERT H. BOSWORTH
BEN C. NICHOLS
RAYMOND F. KACZYNSKI
BY *Herbert L. Davis*
ATTORNEY 3,180,592
HOT GAS CONTROL DEVICE
Edward J. Jeye, Bergenfield, Robert H. Bosworth, Morristown, Ben C. Nichols, Midland Park, and Raymond F. Kaczynski, Verona, N.J., assignors to The Bendix Corporation, Teterboro, N.J., a corporation of Delaware
Filed Apr. 9, 1962, Ser. No. 186,252
10 Claims. (Cl. 244—78)

The present invention relates to a hot gas control device including a fluid pressure operated network and signal amplification means together as compensating mechanism for use in a hot gas flight stabilization system applicable to aircraft and outer space vehicles. More particularly, the control device includes a compensating mechanism applicable to filter or "wash out" steady state rate signals such as might be associated with a flight turn maneuver of an aircraft or outer space vehicle while also serving to attenuate rate signals arising from structural coupling between the body of an aircraft or outer space vehicle and a rate gyro controlled fluid pressure operated network carried thereby and with which the subject control device is cooperatively arranged.

Such fluid pressure operated systems, utilizing hot and cold gases, find increasing application in the control of missiles and spacecraft. Extensive studies in hot gas controls have led to the development of techniques that provide unprecedented degrees of mission reliability in aerodynamic surface actuation, space orientation and stabilization, power generation and utilization, and conversion devices.

Hot gas controls by the very nature of the fluid media employed are unaffected by environment; however, the materials of which hot gas devices are constructed pose their greatest limitation. These limitations are overcome through the use of all facets of gas technology—high temperature materials; fuels compatible with auto-oxidation to avoid the limitations of conventional lubricants, the use of gas expansion principles to allow survival of conventional lubricants, and finally a thermal balance between mission environment duration and material heat sink properties.

Power application techniques involve multiple-power conversions, with attendant complexity and inefficiency. Hot gas provides a method whereby the energy released by fuel or propellant is used in a single conversion to provide horsepower. The equipment, with the exception of the fuel itself, requires no cooling or shielding, thereby making the general techniques independent of complex artificial environments.

The system's simplicity, reliability, and flexibility offer the vehicle manufacturer broad attitudes of application. Some of the many possibilities of the system are as follows:

(1) Combining controls with an accessory power unit,
(2) Selecting fuels capable of multiple functions, as hydrogen-oxygen (breathing, electrical power, control power, main propulsion cooling—as examples).

Additional flexibility is gained by utilizing main engine propellants or main engine gas products.

Also worthy of consideration in evaluating gas controls are:

(1) The elimination of return lines (as compared to hydraulics),
(2) A dry system,
(3) A high degree of storability,
(4) A single power source for atmospheric and space control.

Although hot gas represents a means of providing control actuation and space-attitude control, work is in progress to expand the sphere to other flight-control functions. The concepts under development and designs already available will provide a total control capability, with each individual system combination utilizing the best that the entire control field has to offer.

An object of the invention is to provide such a control device including a light weight, minimum fluid flow consumption control unit operative under high temperature conditions to provide a desired fluid pressure operated control function.

Another object of the invention is to provide a rate gyro operated fluid pressure control device in which the transfer function of the device acting in response to output fluid pressure signals from the gyro is such as to "wash out" relatively low frequency steady-state rate signals associated with turn maneuvers of an aircraft or outer space vehicle and attenuate relatively high frequency signals arising from vehicle structural coupling with the controlling rate gyro and which device is further operatively effective between the low frequency "wash out" range and the high frequency attenuation range to provide in an intermediate frequency signal range high gain output signals.

Another object of the invention is to provide a rate gyro fluid pressure operated control device having a low fluid flow consumption rate to meet the requirements of outer space vehicles and aircraft operation under extremely low fuel consumption conditions.

Another object of the invention is to provide a novel fluid pressure operated rate gyroscope signal receiving control device in which the foregoing is effected by the provision of a diaphragm responsive to a sensed fluid pressure rate signal to transmit a force corresponding to the sensed signal through a fluid medium supplied to a variable volume chamber by a capillary tube under a relatively constant fluid pressure, the fluid pressure medium being so supplied to the variable volume chamber by the capillary tube that the fluid pressure medium is effective to filter or "wash out" relatively low frequency steady-state rate signals such as might be associated with a flight turn maneuver of an aircraft or outer space vehicle, while such fluid pressure medium is effective to transmit rate signals of relatively high frequency applied thereto by the diaphragm to a lever arm for operating a flapper valve system so arranged as to effectively attenuate those extremely high frequency rate signals such as might arise from structural coupling between the body of the aircraft or outer space vehicle while providing high gain output signals in response to rate signals of a normal frequency control range intermediate the low frequency "wash out" range and the high frequency attenuation ranges.

Another object of the invention is to provide a dual balanced bellows arrangement embodying the foregoing features and so arranged as to provide automatic compensation under high temperature and extreme accelerational operating conditions.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
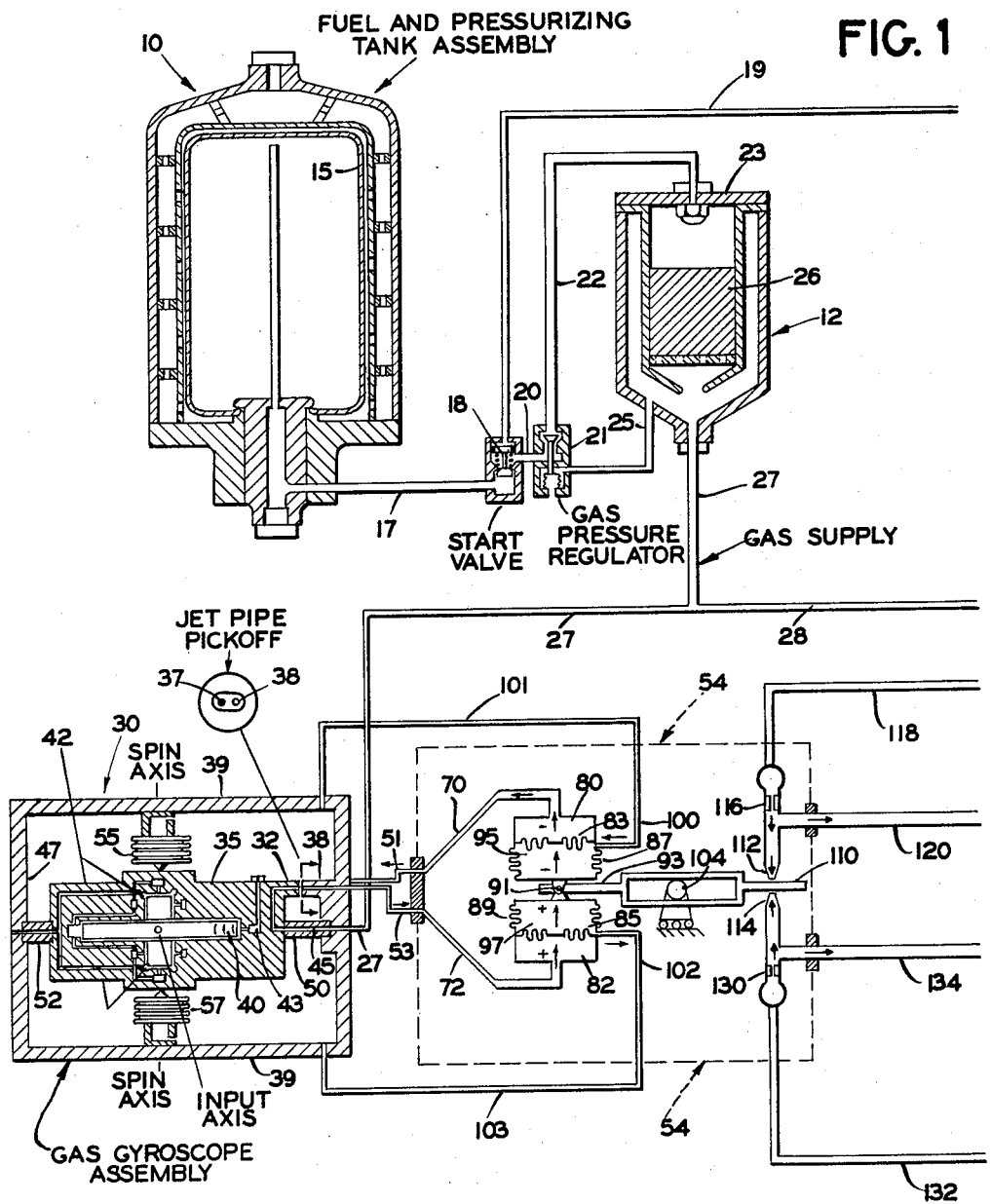
FIGURE 1 is a diagrammatic view of a part of a hot gas flight stabilization system in which there is shown in operative relation a control mechanism embodying the subject matter of the invention.
Figure 2:
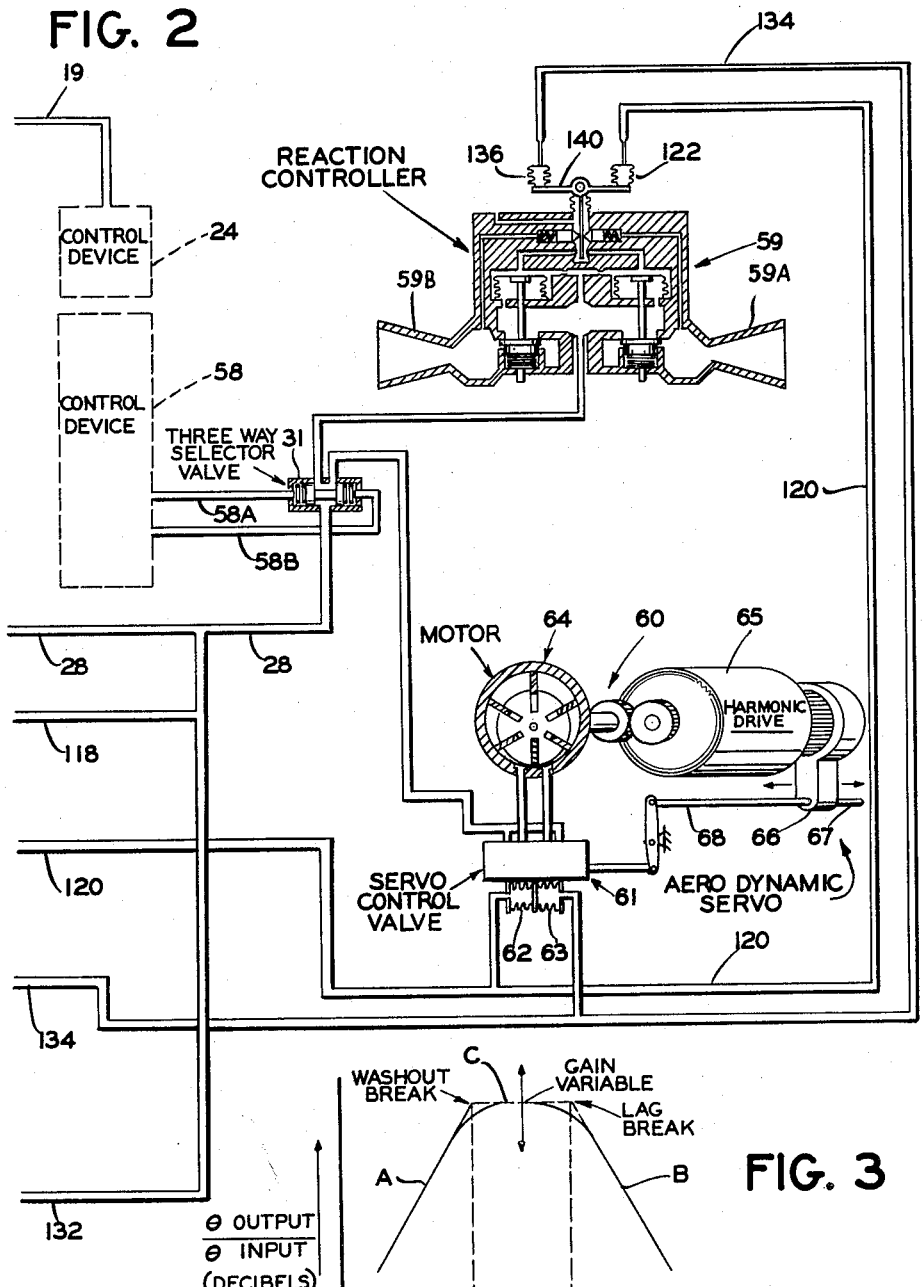
FIGURE 2 is a diagrammatic view of a second part of the hot gas flight stabilization system of FIGURE 1.

Referring to the drawings of FIGURES 1 and 2, there is shown a hot gas stabilization system in which there is provided a fuel tank 10 in which the fuel pressure may be allowed to decay during the duty cycle, but in which the generated gas pressure may be maintained at a constant level of, for example, 600±30 p.s.i.g. by metering the flow of liquid fuel to a gas generator and accumulator assembly indicated by the numeral 12.

The fuel tank 10 may be of a conventional type including an expulsion bladder 15 containing a suitable fuel such as hydrogen peroxide. The tank 10 may be pressurized by a suitable gas such as nitrogen gas to an initial pressure of 1,800 p.s.i.g. The liquid hydrogen peroxide contained in the bladder 15 may then be applied under the pressure of the nitrogen gas in the container 10 to an ouput line 17 controlled by a start valve 18 operated through a control conduit 19. Upon the start valve 18 being opened, the liquid hydrogen peroxide under the pressure of the nitrogen gas will then flow through a conduit 20 and a gas pressure regulator (peroxide metering valve) indicated by the numeral 21 to a conduit 22 leading to the inlet 23 of the gas generator 12.

The start valve 18 may operate in response to an external command signal or fluid pressure applied through the conduit 19 from an outside source or suitable control device 24, shown in FIGURE 2. The gas pressure regulator 21 will control the amount of hydrogen peroxide flowing through conduit 22 into the gas generator 12 in response to the controlling gas outlet pressure from the gas generator and accumulator assembly 12 applied through a conduit 25.

The liquid hydrogen peroxide applied to the gas generator 12 may be decomposed in a silver screen catalyst bed 26 into oxygen and superheated steam having a temperature of approximately 1400° F. The decomposed hydrogen peroxide then flows through an output line 27 from the generator and accumulator assembly 12 to a rate gyroscope indicated generally by the numeral 30 and through an output line 28 to a three-way selector valve 31, as hereinafter explained.

The output line 27 connected to the rate gyroscope 30 opens at a pipe nozzle 32 attached to a gimbal provided by a rotor housing 35 of the rate gyro 30 and operatively positioned in relation to two (2) jet pipe receiver orifices 37 and 38 projecting from an interior surface of the sealed casing 39 of the rate gyro 30.

The jet pipe nozzle 32 and receiver orifices 37 and 38 may be of a conventional type such as shown, for example, by Wunsch et al. U.S. Patent No. 2,345,169, granted March 28, 1944.

Hot gas rate gyro

The gyro assembly 30 is an all gas pressure operated rate gyroscope which may operate under extremely high temperature conditions without any energy source other than the supply gas and may be of a type disclosed in greater detail and claimed in a U.S. application Serial No. 189,144, filed April 20, 1962 by George M. Thomson and James S. Malcolm, and assigned to The Bendix Corporation. Hot gas flight stabilization systems of the aforenoted type are applicable to any type of vehicle including space vehicles subject to high temperature operating environments.

The gyroscope assembly 30 may include a turbine driven rotor 40 which rotates on gas bearings 42, as shown in FIGURE 1, and which may be mounted in the housing 35. The housing 35 has an inlet passage 45 and an outlet passage 47 extending through torsion tubes 50 and 52 which also act as the spring restraint for the rotor housing or enclosure 35 and may be of conventional type. (An alternate design may utilize one hollow torsion tube and one hollow pivot suspended on a gas bearing.) The gimbal motion of the rotor housing 35 is indicated by the jet pipe nozzle 32 projecting from the housing 35 and the position thereof relative to two (2) jet pipe receiver orifices 37 and 38 projecting from the interior surface of the casing 39. Gimbal motion of the rotor housing 35 is damped by two (2) opposing bellows-orifice combinations 55 and 57. The entire mechanism is contained in the sealed casing 39 with inlet connection 45 and exhaust connection 47 for the energizing gas and the conduits 51 and 53 leading from the jet pipe receiver orifices 37 and 38, respectively, to a control mechanism 54.

In the operation of the hot gas rate gyroscope 30, shown in FIGURE 1, hydrogen peroxide gas, under pressure and applied through conduit 27 and inlet passage 45 in torsion tube 50 is applied through the jet pipe nozzle 32 projecting from the gyro rotor housing 35. Any motion of housing 35 is detected by means of the differential pressure effected between the two jet pipe receiver orifices 37 and 38 by the adjusted position of the jet pipe nozzle 32 in relation thereto. The gas is then accumulated in the gyroscope case 39 and is bled into the turbine or gyroscope rotor wheel 40 and gas bearing cavities 42 through a passage 43 so as to rotate the gyroscope rotor wheel 40 and energize the gas bearings 42 on which the rotor wheel 40 is suspended.

The rotation of the rotor wheel 40 effects an angular momentum about the spin axis of the gyroscope rotor 40 which, in turn, creates a gyroscopic torque about the output axis when an angular velocity is applied about the input axis. This torque produces gimbal motion about the output axis which is restrained by the torsion tube or tubes 50 and 52 and is indicated by the adjusted position of the jet pipe nozzle 32 relative to the receiver orifices 37 and 38, as previously described.

Undesirable oscillatory motions of the gimbal or rotor housing 35 are damped by two (2) opposing bellows-orifice combinations 55 and 57 acting between the gimbal or rotor housing 35 and the casing 39. This is accomplished by one of the bellows for example 55 pressing a volume of the gas and exhaling it through an orifice while the other bellows, for example, 57, expands a volume of gas and inhales it through an orifice. Each of the bellows 55 and 57 alternately expands and compresses the gas in one complete cycle.

The three-way valve 31, shown in FIGURE 2, may be operable by a command or fluid pressure signal from a suitable control device 58 applied through conduits 58A and 58B so as to selectively render operative a jet reaction controller indicated generally by the numeral 59 or an aerodynamic servo indicated generally by the numeral 60. Thus, the operation of the three-way valve 31 may select the mechanism to be effective in controlling the aircraft or outer space vehicle by applying a flow of controlling hot gas so as to operate the appropriate controller 59 or 60.

The gas driven rate gyroscope 30, as heretofore explained, includes the rotor 40 which spins on gas bearings 42 at extremely high rates of speed of, for example, 120,000 r.p.m. so as to provide a necessary flight orientation (single axis) signal to the compensated control mechanism 54. The control mechanism 54 includes, as hereinafter explained, a filter arrangement which may filter or "wash out" the low frequency steady-state rate signals associated with a turn maneuver of the aircraft or outer space vehicle and a flapper servo valve amplifier.

The output of the compensated control mechanism 54 provides a differential pressure output signal which is applied so as to control the reaction controller 59 and the aerodynamic servo 60, as hereinafter explained.

The jet reaction controller 59 may include an automatic proportional type of gas metered thrust chamber and two opposed nozzles 59A and 59B so arranged that each chamber may produce a thrust of, for example, one hundred pounds. The aerodynamic surface controller 60 may include a servo valve 61 of a four-way proportional type having a weight flow rate proportional to the input with a constant supply pressure and controlled by differential pressure output signals from the control mechanism 54 applied to control bellows 62 and 63. The output of this valve 61 is applied to a rotary expansion vane type motor 64 which drives a mechanical transmission 65. This transmission 65 is mechanically connected by an arm 66 and linkage 67 to the aerodynamic control surfaces, not shown, of the aircraft or outer space vehicle and leading from the arm 67 is a position feedback linkage 68 to reposition to valve 61 with changes in the position of the arm 67 and the aerodynamic control surfaces operatively positioned thereby.

Control mechanism

As shown schematically in FIGURE 1, the output conduits 51 and 53 lead from the jet pipe receiver orifices 37 and 38, respectively, to input lines 70 and 72 of the control mechanism 54 which are in turn connected to dead-ended chambers 80 and 82 of identical structure and having rigid walls except for walls defined by flexible diaphragms 83 and 85, respectively.

The diaphragms 83 and 85 separate the dead-ended chambers 80 and 82 from the interior of flexible bellows 87 and 89 arranged in balanced relation and operatively connected at 91 to lever arm 93.

The bellows 87 and 89 provide interiorly thereof variable volumes 95 and 97, respectively, and opening into the interiors of the bellows 87 and 89, are capillary tubes 100 and 102 leading to and from the interior of the sealed casing 39 of the gyro 30 so as to connect to the interior of the bellows 87 and 89 a substantially constant pressure source of hot gaseous fluid pressure medium applied through conduits 101 and 103 connected to the interior of the casing 39 of the gyroscope 30.

As shown schematically in FIGURE 1, the lever arm 93 of the control mechanism 54 is pivotally mounted on a fulcrum 104 which may be adjustably positioned in a suitable manner by the operator to provide various selected mechanical advantages. The lever arm 93 is adjustably positioned about the fulcrum 104 so as to control the position of a flapper valve 110 relative to suitable fluid pressure orifices 112 and 114 to cause a pressure change to occur in the chamber between the valve orifice 112 and a restricted orifice 116 leading through a conduit 118 to the source of fluid pressure medium applied through conduit 28. The change in the differential pressure applied in the chamber between the valve orifice 112 and the restricted orifice 116 is in turn applied through a conduit 120 to a suitable bellows 122 to effect a control function, as shown diagrammatically in the system of FIGURES 1 and 2.

The adjustment of the flapper valve 110 relative to the valve orifice 112 will effect in an opposite sense the valve orifice 114 to cause in turn a pressure change in an opposite sense in the chamber between the valve orifice 114 and a restricted orifice 130 leading through conduit 132 to the source of fluid pressure medium applied through conduit 28. The change in the differential pressure applied in the chamber between the valve orifice 114 and the restricted orifice 130 is in turn applied through a conduit 134 to a suitable bellows 136 so as to act with the bellows 122 to control the position of a pivotal arm 140 to effectively control the jet reaction controller 59. Similarly the differential pressure signals applied through the output lines 120 and 134 of the control mechanism 54 are effective to control the differential control bellows 62 and 63 of the servo valve 61 of the aerodynamic servo 60 for positioning aerodynamic surfaces of the aircraft or outerspace vehicle as well as the jet reaction controller 59 for controlling the attitude of the aircraft or outer space vehicle.

In the operation of the control mechanism 54, upon a differential pressure signal being applied through output conduits 51 and 53 of the rate gyroscope 30 by the displacement of the position of the jet pipe nozzle 32 relative to the receiver orifices 37 and 38, this differential pressure signal will cause a change in the volume of chambers 80 and 82 due to the resulting deflection in opposite senses of diaphragms 83 and 85. The resulting displacement of the diaphragms 83 and 85 will in turn then cause a change in the volumes 95 and 97 of the bellows 87 and 89, respectively, which in turn will act through the fluid gaseous medium within the bellows 87 and 89 to effect a displacement of the bellows 87 and 89 in opposite senses and a resulting displacement thereby of the lever arm 93 to cause in turn the flapper valve 110 to be so adjusted relative to the valve orifices 112 and 114 as to effect through the flapper valve controlled system an adjustment of the control arm 140 of the reaction controller 59 and the servo control valve 61 of the aerodynamic servo 60 to provide the desired control function.

The respective changes in opposite senses in the pressure of the fluid medium in the volumes 95 and 97 will also cause a restricted flow of fluid medium through the capillary tube 100 in one sense and a restricted flow of fluid medium through the capillary tube 102 in an opposite sense until a steady-state condition has been effected. The resulting adjustment of the lever arm 93 and flapper valve 110 will in turn cause a differential pressure change in the flapper system and differential pressure signal applied to the output lines 120 and 134 to control suitable mechanism on the aircraft or outer space vehicle such as the aerodynamic servo 60 or gas reaction controller 59 for controlling the flight atitude of the aircraft or vehicle in outer space.

Operation

Figure 3:
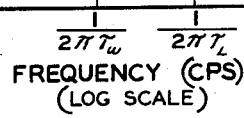
FIGURE 3 is a magnitude ratio diagram illustrating graphically the relationship between the input frequency of the controlling signal and the output gain effected by the control mechanism of FIGURE 1 in the low frequency, intermediate frequency and high frequency signal operating ranges.

In the operation of the system of FIGURES 1 and 2, it will be seen that the control mechanism 54 includes a fluid pressure operated network and signal amplification means which when utilized in the fluid pressure operated flight stabilization system of FIGURES 1 and 2 will perform two required system functions; to wit, the mechanism 54 will filter or "wash out" steady-state rate signals associated with a flight turn maneuver of an aircraft or outer space vehicle (low frequency signals) as indicated graphically in FIGURE 3 by the line A and attenuate rate signals arising from structural coupling of the body of the aircraft or outer space vehicle with the rate gyroscope 30 (high frequency signals) as indicated graphically in FIGURE 3 by the line B, while providing high gain output signals in response to input signals applied over a normal intermediate operating range (intermediate frequency signals) as indicated graphically in FIGURE 3 by the line C.

The frictional resistance of the input lines 70 and 72, as well as the capillary lines 100 and 102, together with the flexibility of the diaphragms 83 and 85 and bellows 87 and 89 and the compressibility of the fluid medium in the volumes 95 and 97 under the pressure of the fluid medium applied through the capillary lines 100 and 102 and subject to the changing pressure of the fluid medium applied to the diaphragms 83 and 85 in response to an input signal is such that upon a change in the input signal at the relatively low frequency indicated graphically by the line A of FIGURE 3, the leakage afforded by the capillary tubes 100 and 102 to the changing pressure in the volumes 95 and 97 is such as to tend to "wash out" or retard the transfer of the low frequency signals to the lever arm 93. Thus, such low frequency signals have little or no controlling effect on the flapper system so that steady-state rate signals associated with a flight turn maneuver of the aircraft or outer space vehicle or low frequency signals due to poor gyroscope nulls may be effectively eliminated, filtered or washed out.

Moreover, higher frequency signals indicated graphically by the lines C and B of FIGURE 3 are not filtered or "washed out" by the action of the capillary lines 100 and 102, but instead such higher frequency signals are transferred through the diaphragms 83 and 85, pressure medium in the volumes 95 and 97 and bellows 87 and 89 to the lever arm 93.

Furthermore, such signals within the intermediate frequency range indicated graphically by the line C of FIGURE 3 are amplified by the flapper system so as to provide high gain output control signals, while such higher frequency signals coming within the high frequency range indicated graphically by the line B of FIGURE 3, are effectively attenuated. In effecting the latter attenuation, the area of the flapper valve 110 in cooperative relation with the valve orifices 112 and 114 and the frictional resistance of the lines 120 and 134 together with the volume of the controlled bellows 112 and 136 is such that the response thereof to the rapidly changing input signal progressively decreases with an increase in the frequency of such high frequency signals over the range indicated graphically by the line B of FIGURE 3, so as to thereby effectively attenuate and eliminate those extremely high frequency rate signals arising from structural coupling of the body of the aircraft or outer space vehicle with the rate gyroscope 30.

*Modified form of the compensated control mechanism*

Figure 4:
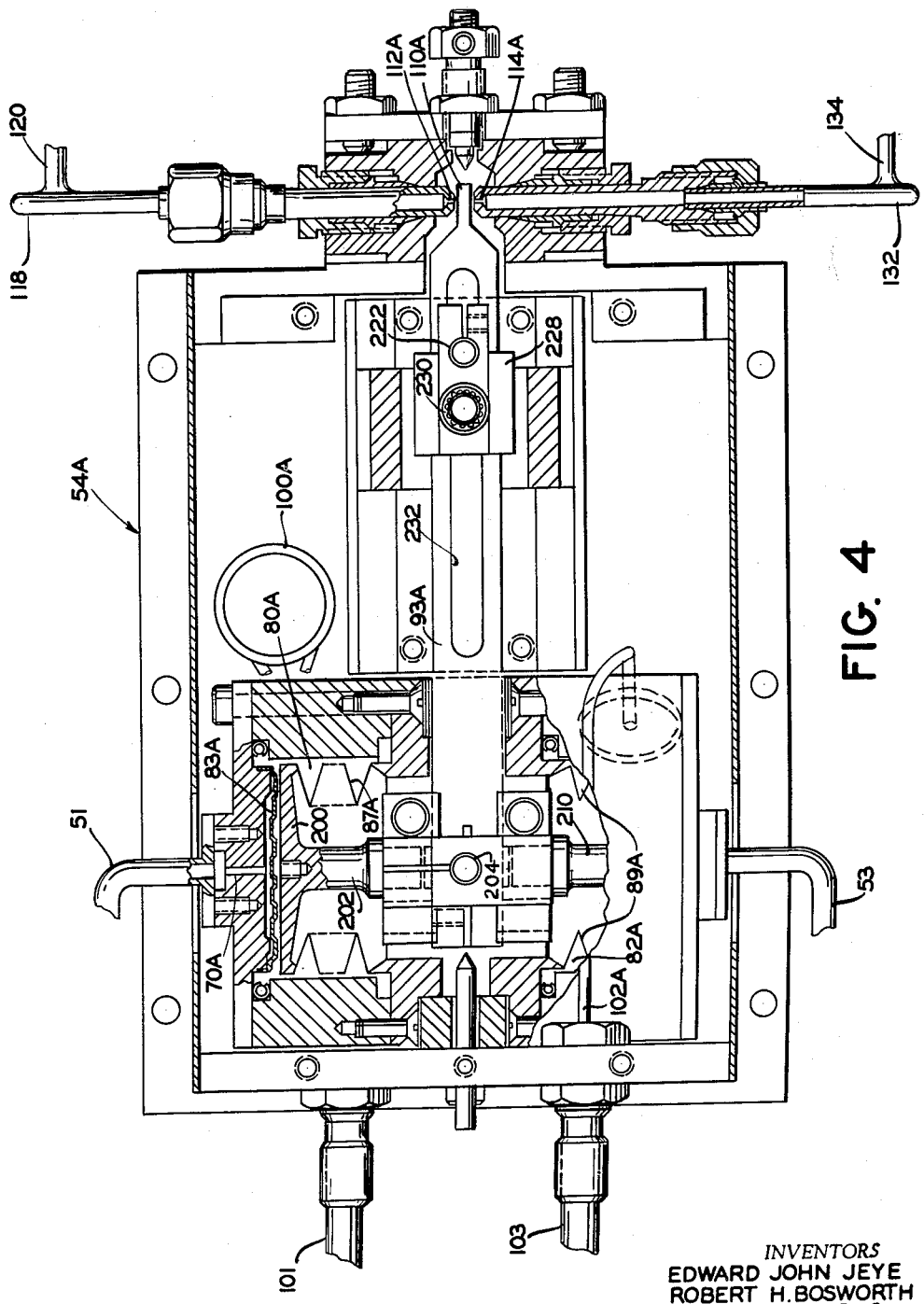
FIGURE 4 is a detail sectional view of a modified form of the control mechanism embodying the invention.
Figure 5:
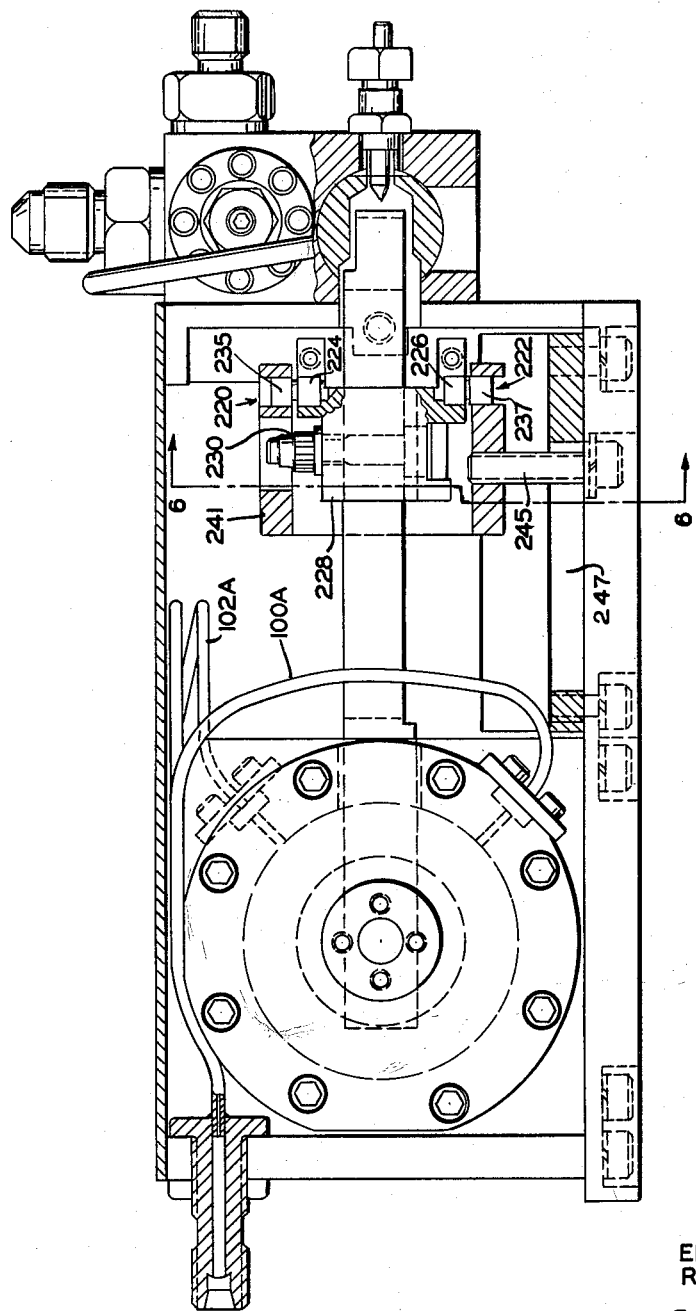
FIGURE 5 is a top plan view of the control mechanism of FIGURE 4 with certain parts broken away.
Figure 6:
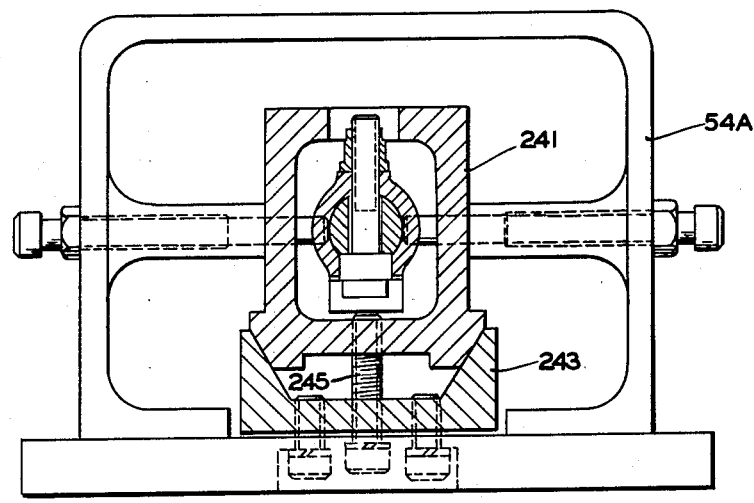
FIGURE 6 is a sectional view of the control mechanism of FIGURE 5 taken along the lines 6—6 and looking in the direction of the arrows.

A modified form of the control mechanism 54 of FIGURE 1 is shown in FIGURES 4, 5 and 6 in which corresponding parts are indicated by like numerals to which there has been applied the suffix A.

In the modified form of the control mechanism 54A of FIGURES 4 and 5, there is provided a diaphragm 83A responsive to fluid pressure signal applied through a passage 70A leading from the output line 51 of the gyroscope 30, as shown in FIGURE 1.

The diaphragm 83A is flexibly mounted in a chamber 80A which is connected through a capillary tube 100A and conduit 101 to a constant reference pressure source such as the hot gas applied in the casing 39 of the gyroscope 30, as shown in FIGURE 1. Furthermore, as shown in FIGURE 4, there is flexibly mounted in the chamber 80A, a bellows 87A responsive to changes in the pressure of the gaseous medium applied in the chamber 80A and having a free end operatively connected to a plate 200 which is in turn connected through a rod 202 to a flexural pivot 204 mounted at one end of the lever arm 93A. At the opposite side of the lever arm 93A, there is similarly provided a diaphragm, not shown, responsive to a fluid pressure signal applied through a passage leading from the output line 53 of the gyroscope 30, as shown in FIGURE 1.

The last-mentioned diaphragm has a similar arrangement to that of the diaphragm 83A, and is flexibly mounted in a chamber 82A which is connected through a capillary tube 102A and conduit 103 to a constant reference pressure source such as the hot gas applied in the casing 39 of the gyroscope 30, as shown in FIGURE 1. Furthermore, as shown in FIGURE 4, there is flexibly mounted in the chamber 82A a bellows 89A responsive to changes in the pressure of the gaseous medium applied in the chamber 82A and having a free end operatively connected through a rod 210 to the flexural pivot 204. The flexural pivot 204 may be of a type disclosed and claimed in U.S. application Serial No. 11,290, filed February 26, 1960 by Henry Troeger, and assigned to The Bendix Corporation.

The arm 93A is further pivotally mounted on flexural pivots 220 and 222, shown in FIGURE 5, and which may be of the type disclosed and claimed in the aforenoted U.S. application Serial No. 11,290.

The flexural pivots 220 and 222 may have portions thereof 224 and 226, respectively, secured in a bracket 228 slidably fastened to the lever arm 93 by a clamping bolt 230 which may be adjustably positioned in a slot 232, as shown in FIGURE 4.

Further, as shown in FIGURE 5, the flexural pivots 220 and 222 include opposite portions 235 and 237 flexibly mounted relative to the portions 224 and 226. Further, the portions 235 and 237 of the flexural pivots 220 and 222, respectively, are each secured in a bracket member 241 which as shown in FIGURE 6 is slidably mounted in a track 243 and fastened in adjusted position by a clamping bolt 245. The clamping bolt 245, as shown in FIGURE 5, may be slidably adjusted in a slot 247.

It will be seen then that the lever arm 93A is pivotally mounted on the flexural pivots 220 and 222 and that the flexural pivots 220 and 222 may be adjustably positioned relative to the lever arm 93A by the positioning of the bracket 241 in the track 243 so as to provide various selective advantages. Further, the lever arm 93 is adjustably positioned about the flexural pivots 220 and 222 so as to control the position of the flapper valve 110A relative to suitable fluid pressure orifices 112A and 114A to cause a pressure change to occur in the output signal lines 120 and 134, as heretofore explained with reference to the schematic diagram of FIGURE 1.

The explanation of the operation of the control mechanism 54, as heretofore set forth with reference to the system of FIGURE 1, applies equally to the operation of the control mechanism 54A of FIGURES 4, 5, and 6, as applied to the system of FIGURE 1 and therefore no further explanation is deemed necessary.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a flight vehicle of a type including means for controlling an attitude of the vehicle, a rate gyroscope carried by said vehicle, and means operatively connecting the rate gyroscope to the attitude control means; the improvement in which said connecting means comprises a compensating mechanism including first means to eliminate output signals from said rate gyroscope of a low frequency range associated with turn maneuvers in flight of the vehicle, second means to attenuate output signals from the rate gyroscope of an extremely high frequency range caused by structural coupling between the vehicle and the rate gyroscope carried thereby, said second means including means to provide a high gain in the output signals from said rate gyroscope over a frequency range intermediate said low frequency range and said extremely high frequency range, said first means includes a signal transmitting means, a pair of balanced pressure transmitting bellows operatively connected to the signal transmitting means, diaphragm means sensitive to output signals from the rate gyroscope, gaseous pressure means within said bellows to operatively associate each bellows to said diaphragm means, and a capillary tube operatively connecting the gaseous pressure means within each of said bellows to a constant fluid pressure source so as to render said gaseous pressure means ineffective to transmit to said bellows the output signals from said rate gyroscope of the low frequency range applied to said signal sensitive diaphragm means.

2. In a flight vehicle of a type including means for controlling an attitude of the vehicle, a rate gyroscope carried by said vehicle, and means operatively connecting the rate gyroscope to the attitude control means; the improvement in which said connecting means comprises a compensating mechanism including first means to eliminate output signals from said rate gyroscope of a low frequency range associated with turn maneuvers in flight of the vehicle, second means to attenuate output signals from the rate gyroscope of an extremely high frequency range caused by structural coupling between the vehicle and the rate gyroscope carried thereby, said second means including means to provide a high gain in the output signals from said rate gyroscope over a frequency range intermediate said low ferquency range and said extremely high frequency range, said first means includes a signal transmitting lever, a pair of balanced pressure transmitting bellows operatively connected to the signal transmitting lever, diaphragm means sensitive to output signals from the rate gyroscope and operatively associated with each bellows, a capillary tube operatively connecting each of said bellows to a constant fluid pressure source so as to render ineffective the output signals from said rate gyroscope of the low frequency range and transmitted to each of said bellows by said signal sensitive diaphragm means, and in which said second means includes a flapper valve means operatively associated with the attitude control means for the vehicle, means operatively connecting said signal transmitting lever to said flapper valve means, said flapper valve means being so arranged as to effectively attenuate the output signals from the rate gyroscope applied thereto by said signal transmitting lever and of the extremely high frequency range caused by the structural coupling between the vehicle and the rate gyroscope carried thereby, and said flapper valve means being so arranged as to provide a high gain in output signals from said rate gyroscope applied thereto by said signal transmitting lever over the frequency range intermediate said low frequency range and said extremely high frequency range.

3. A gaseous pressure operated controller mechanism comprising, in combination, a signal transmitting means, a pair of balanced pressure transmitting bellows operatively connected to the signal transmitting means, diaphragm means sensitive to input signals, gaseous pressure means within each bellows to operatively associate each bellows to said diaphragm means, and a capillary tube opening each of said bellows to a constant gaseous pressure source so as to render said gaseous pressure means ineffective to transmit the input signals of a low frequency range from said signal sensitive diaphragm means to said bellows.

4. A gas pressure operated controller mechanism comprising, in combination, a signal transmitting lever, a pair of balanced pressure transmitting bellows operatively connected to the signal transmitting lever at opposite sides thereof, diaphragm means sensitive to input signals and operatively associated with each bellows, a capillary tube operatively connecting each of said bellows to a constant gaseous pressure source so as to render ineffective the input signals of a low frequency range and transmitted to each of said bellows by said signal sensitive diaphragm means, a flapper valve means, means operatively connecting said signal transmitting lever to said flapper valve means, said flapper valve means being so arranged as to effectively attenuate input signals of an extremely high frequency range applied thereto by said signal transmitting lever, and said flapper valve means being so arranged as to provide a high gain in input signals applied thereto by said signal transmitting lever over a frequency range intermediate said low frequency range and said extremely high frequency range.

5. A gaseous pressure operated controller mechanism comprising, in combination, a signal transmitting member, a pair of variable volume chambers positioned at opposite sides of the signal transmitting member, each of said variable volume chambers including a diaphragm mounted therein and sensitive to a variable fluid pressure signal applied at one side thereof, bellows flexibly mounted in said variable volume chamber at the opposite side of said diaphragm and operatively connected to said signal transmitting member, a capillary tube operatively connecting each of said variable volume chambers to a constant gaseous pressure source so as to render fluid input pressure signals applied to the diaphragm within a low frequency range ineffective on the bellows flexibly mounted in the variable volume pressure chamber, a flapper valve means, means operatively connecting said signal transmitting member to said flapper valve means, said flapper valve means being arranged so as to attenuate input fluid pressure signals applied to said diaphragm within an extremely high frequency range, and said flapper valve means being operative by said signal transmitting member so as to provide a high gain in input fluid pressure signals applied to said diaphragm over a frequency range intermediate said low frequency range and said extremely high frequency range.

6. A gaseous pressure operated controller mechanism comprising, in combination, a signal transmitting means, a pair of balanced pressure transmitting bellows operatively connected to the signal transmitting means, diaphragm means sensitive to input signals, gaseous pressure means to operatively associate each bellows to said diaphragm means so as to transmit input signals applied to said diaphragm means to each of said bellows, and a capillary tube operatively connecting said gaseous pressure means to a constant gaseous pressure source so as to render said gaseous pressure means ineffective to transmit input signals of a low frequency range from said diaphragm means to each of said bellows.

7. A gaseous pressure operated controller mechanism comprising, in combination, a signal transmitting member, a first pressure responsive means operatively connected to the signal transmitting member, a second pressure responsive means sensitive to input signals, gaseous pressure means to operatively associate said first and second pressure responsive means so as to transmit signals from said second pressure responsive means to said first pressure responsive means to operate the signal transmitting member, and capillary tube means to render said gaseous pressure means ineffective to transmit input signals of a low frequency range from said second pressure responsive means to said first pressure responsive means while said gaseous pressure means remains effective to transmit input signals of a high frequency range from said second pressure responsive means to said first pressure responsive means.

8. A gaseous pressure operated controller mechanism comprising, in combination, a signal transmitting member, a first pressure responsive means operatively connected to the signal transmitting member, a second pressure responsive means sensitive to input signals, gaseous pressure means to operatively associate said first and second pressure responsive means so as to transmit signals from said second pressure responsive means to said first pressure responsive means to operate the signal transmitting member, capillary tube means operatively connecting said gaseous pressure means to a constant pressure source so as to render said gaseous pressure means ineffective to transmit input signals of a low frequency range from said second pressure responsive means to said first pressure responsive means while said gaseous pressure means remains effective to transmit input signals of a high frequency range from said second pressure responsive means to said first pressure responsive means, and control means operatively connected to said signal transmitting member to effectively attenuate said input signals of an extremely high frequency range while providing high gain output signals in response to the input signals having a frequency range intermediate said low frequency range and said extremely high frequency range.

9. In a flight vehicle of a type including means for controlling an attitude of the vehicle, a rate gyroscope carried by said vehicle, and means operatively connecting the rate gyroscope to the attitude control means; the improvement in which said connecting means comprises a signal transmitting member, a first pressure responsive means operatively connected to the signal transmitting member, a second pressure responsive means sensitive to input signals, gaseous pressure means to operatively associate said first and second pressure responsive means so as to transmit signals from said second pressure responsive means to said first pressure responsive means to operate the signal transmitting member, capillary tube means operatively connecting said gaseous pressure means to a constant pressure source so as to render said gaseous pressure means ineffective to transmit input signals of a low frequency range from said second pressure responsive means to said first pressure responsive means while said gaseous pressure means remains effective to transmit input signals of a high frequency range from said second pressure responsive means to said first pressure responsive means to operate said signal transmitting member, means for applying input signals to said second pressure responsive means from said rate gyroscope, and other means for operatively connecting said signal transmitting member to the means for controlling the attitude of the vehicle.

10. In a flight vehicle of a type including means for controlling an attitude of the vehicle, a rate gyroscope carried by said vehicle, and means operatively connecting the rate gyroscope to the attitude control means; the improvement in which said connecting means comprises a signal transmitting member, a first pressure responsive means operatively connected to the signal transmitting member, a second pressure responsive means sensitive to input signals, gaseous pressure means within said first pressure responsive means to operatively associate said first and second pressure responsive means to transmit signals from said second pressure responsive means to said first pressure responsive means to operate the signal transmitting member, capillary tube means opening from said first pressure responsive means to a constant pressure source so as to render said gaseous pressure responsive means ineffective to transmit input signals of a low frequency range from said second pressure responsive means to said first pressure responsive means while said gaseous pressure means remains effective to transmit input signals of a high frequency range from said second pressure responsive means to said first pressure responsive means, control means operatively connected to said signal transmitting member to effectively attenuate said input signals of an extremely high frequency range while providing high gain output signals in response to the input signals having a frequency range intermediate said low frequency range and said extremely high frequency range, means for applying input signals to said second pressure responsive means from said rate gyroscope, and other means for operatively connecting the high gain output signals provided by said control means to the means for controlling the attitude of the vehicle.

References Cited by the Examiner
UNITED STATES PATENTS

| | | | |
|---|---|---|---|
| 2,382,727 | 8/45 | Kronenberger | 244—79 |
| 2,834,363 | 5/58 | Pessen | 137—86 X |
| 2,945,478 | 7/60 | Hanna | 137—85 X |
| 3,049,189 | 8/62 | Riordan | 244—79 X |

MILTON BUCHLER, *Primary Examiner.*

ANDREW H. FARRELL, *Examiner.*